United States Patent
Neamsuwan et al.

(10) Patent No.: US 8,763,790 B1
(45) Date of Patent: Jul. 1, 2014

(54) CLEAN ROOM ROLLER CONVEYOR WITH MOTORS BETWEEN AND TORQUING DRIVE ROLLER PAIRS

(75) Inventors: Jadet Neamsuwan, Bangplee (TH);
Wanchai Sedklang, Ampurmaung (TH);
Montree Changpradit, Ayuthaya (TH);
Parag K. Chhajed, Pune (IN);
Arjunaidi Abdul Rashid Durai, Pathumthani (TH)

(73) Assignee: Western Digital Technologies, Inc., Irvine, CA (US)

( * ) Notice: Subject to any disclaimer, the term of this patent is extended or adjusted under 35 U.S.C. 154(b) by 237 days.

(21) Appl. No.: 13/115,828

(22) Filed: May 25, 2011

(51) Int. Cl.
*B65G 23/08* (2006.01)

(52) U.S. Cl.
USPC .......................................... 198/788; 198/789

(58) Field of Classification Search
None
See application file for complete search history.

(56) References Cited

U.S. PATENT DOCUMENTS

| | | | |
|---|---|---|---|
| 5,829,743 A * | 11/1998 | DeLand et al. | 271/273 |
| 5,904,239 A | 5/1999 | Narisawa | |
| 6,098,786 A * | 8/2000 | Brumm et al. | 198/495 |
| 6,206,181 B1 | 3/2001 | Syverson | |
| 6,450,325 B1 | 9/2002 | Devnani | |
| 6,460,683 B1 | 10/2002 | Pfeiffer | |
| 6,860,381 B2 | 3/2005 | Newsom et al. | |
| 7,938,253 B2 * | 5/2011 | Whittlesey | 198/617 |
| 2006/0016668 A1 * | 1/2006 | Helgerson et al. | 198/805 |
| 2007/0034478 A1 * | 2/2007 | Wolf | 198/370.08 |
| 2007/0059144 A1 | 3/2007 | Lowrance et al. | |
| 2007/0059153 A1 | 3/2007 | Lowrance et al. | |
| 2007/0137981 A1 * | 6/2007 | Kettelson | 198/411 |
| 2008/0257684 A1 * | 10/2008 | Weller | 198/436 |

FOREIGN PATENT DOCUMENTS

WO 0138205 A1 5/2001

\* cited by examiner

*Primary Examiner* — Gene Crawford
*Assistant Examiner* — Lester Rushin

(57) ABSTRACT

A clean room conveyor comprises a first guide rail and a plurality of motors coupled to the first guide rail, and a plurality of drive roller pairs. Each drive roller pair comprises two drive rollers, with a corresponding one of the plurality of motors disposed between the two drive rollers and applying torque to both of the two drive rollers.

11 Claims, 2 Drawing Sheets

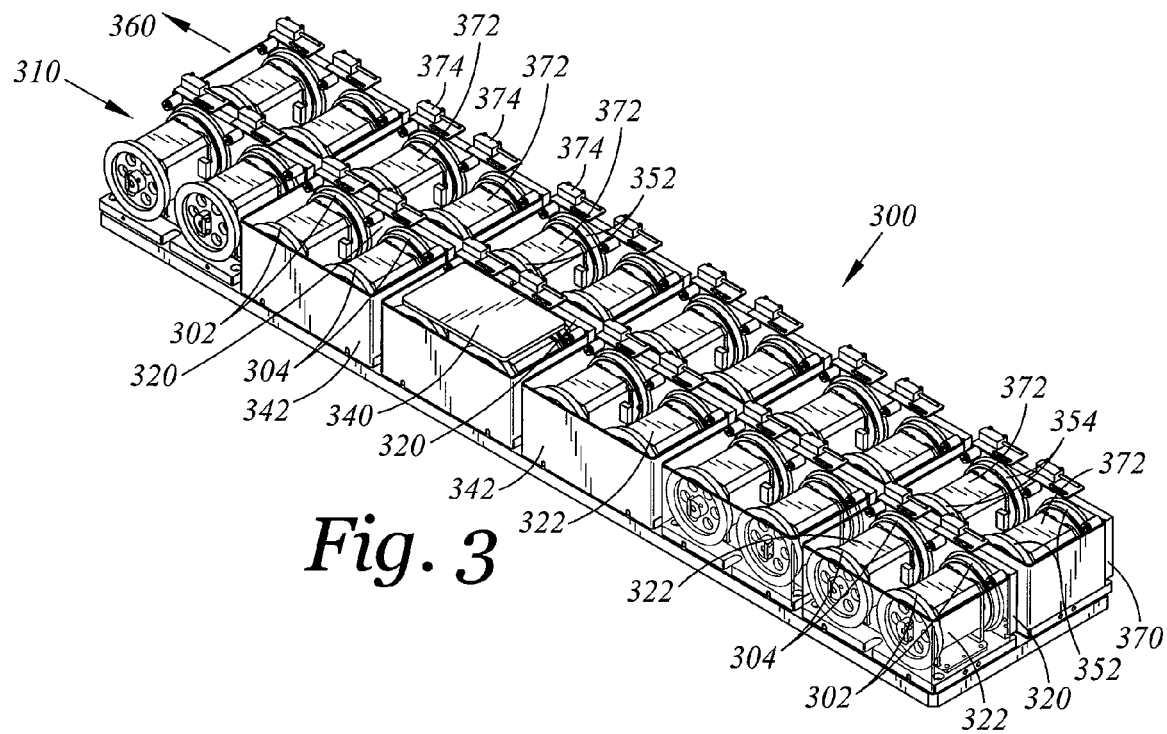
Fig. 3
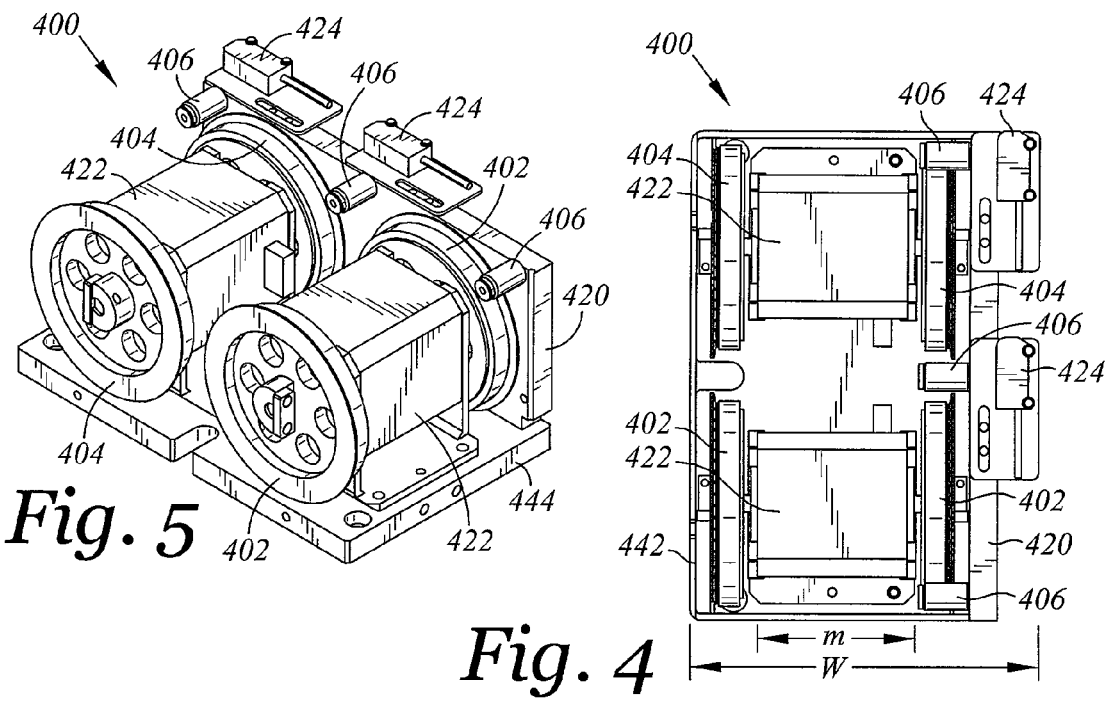
Fig. 5
Fig. 4

US 8,763,790 B1

CLEAN ROOM ROLLER CONVEYOR WITH MOTORS BETWEEN AND TORQUING DRIVE ROLLER PAIRS

BACKGROUND

Parts and materials may be moved in a manufacturing environment by roller conveyors that have many rollers to support the parts and materials, and/or to support a tray or pallet that holds the parts and materials. Conventional roller conveyors typically have many idle and driven rollers disposed between guide rails along which the parts and materials are moved.

Roller conveyors that operate in clean room manufacturing environments must satisfy certain requirements that may not be important in other industrial environments. For example, it may be desired for a roller conveyor in a clean room manufacturing environment to be designed to operate in such a way that certain debris-generating occurrences are prevented or reduced. Such debris-generating occurrences may include collisions between upstream and downstream parts, materials, trays, or pallets. Such collisions may cause an amount of debris that would be unacceptable in many clean room environments. Also, an unacceptable amount of debris may be generated if a drive roller is forced to rotate and rub against a part or tray that has been impeded from traveling along the conveyor at the speed that would otherwise have been compelled by the drive roller.

Clean room roller conveyors have been disclosed in the art to prevent or reduce such debris-generating occurrences. For example, so-called "zone controlled" conveyors have multiple sensors and drive rollers that are driven independently or in groups. The drive rollers may be independently driven in response to the sensor output, so that the conveyor will not attempt to propel an upstream part or tray into a downstream zone unless that downstream zone is free to accept the upstream part or tray without collision or obstruction. Hence, through the use of several independently controlled motors driving rollers in various zones of the conveyor, debris-generating occurrences may be reduced in the clean room manufacturing environment.

FIG. 1 is a perspective view of a contemporary zone-controlled clean room conveyor 100. The clean room conveyor 100 includes a plurality of drive rollers 102 and a plurality of idle rollers 112 disposed between a first guide rail 120 and a second guide rail 130. The first guide rail 120 includes a plurality of independently controllable motors 122, each driving a drive roller 102. The second guide rail 130 supports the plurality of idle rollers 112, which are not driven by any motor. Each of the drive rollers 102 is opposite one of the idle rollers 112, so that the moving part or pallet encounters successive pairs of rollers, each pair including one drive roller 102 and one idle roller 112. The contemporary zone-controlled clean room conveyor may be divided into zones, each zone comprising a sub-group of the plurality of independently controllable motors 122.

FIG. 2 is a top view of the contemporary clean room conveyor 100. The first guide rail 120 of the contemporary zone-controlled clean room conveyor 100 is wider than the second guide rail 130, because the first guide rail 120 includes the plurality of independently controllable motors 122, while the second guide rail 130 does not include any motors. The minimum width of the contemporary zone-controlled clean room conveyor 100 includes the width of the first and second guide rails 120, 130 themselves, plus the minimum spacing between the first and second guide rails that is required to accommodate the parts, material, trays, and/or pallets that must be moved by the conveyor 100.

Due to the equipment and procedures required to keep a clean room environment acceptably clean during manufacturing operations, clean room facilities are more expensive than industrial, manufacturing, and assembly space outside of the clean room facilities. Therefore, space within clean room facilities is generally limited, and there is a need in the art for a clean room conveyor having a reduced width, for example to make room for other conveyors, equipment, tools, work space, or supplies within the clean room facilities.

BRIEF DESCRIPTION OF THE DRAWINGS

FIG. 3 is a perspective view of a dual-path clean room conveyor, according to an embodiment of the present invention.

FIG. 4 is a top view of a single-path clean room conveyor according to another embodiment of the present invention.

FIG. 5 is a perspective view of the clean room conveyor of FIG. 4.

DESCRIPTION OF PREFERRED EMBODIMENTS

Figure 1:
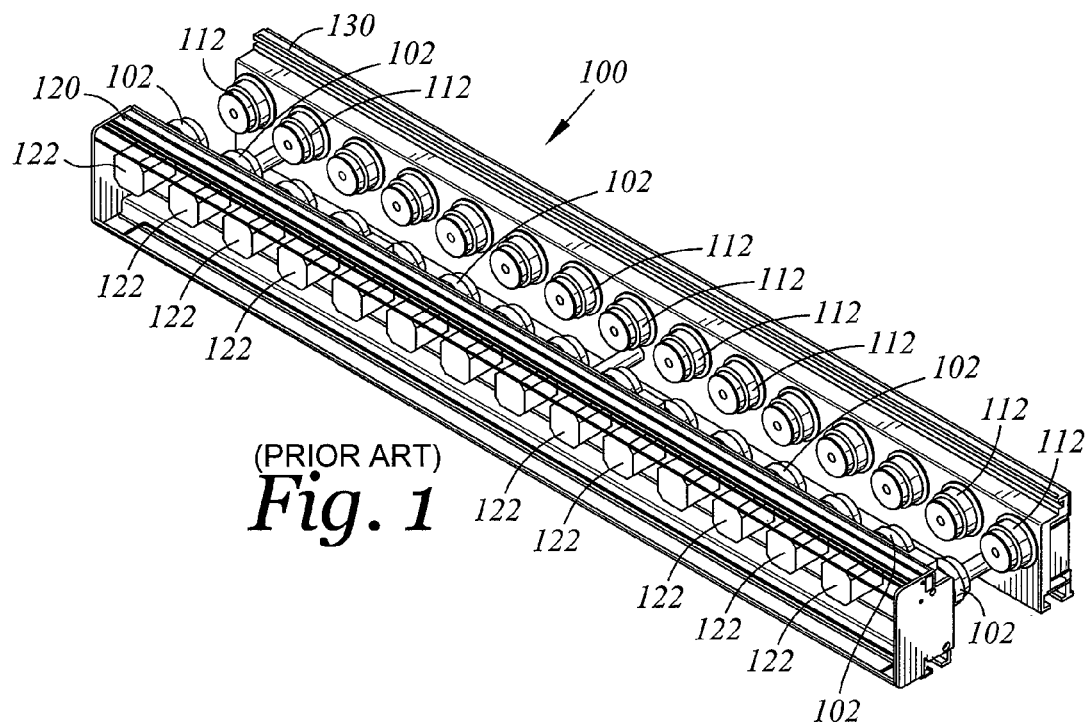
FIG. 1 is a perspective view of a contemporary clean room conveyor.
Figure 2:
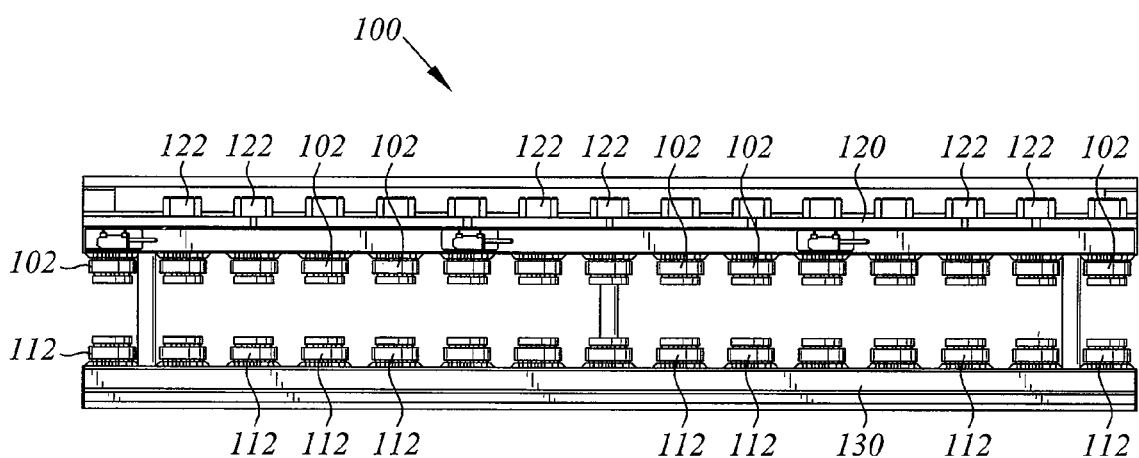
FIG. 2 is a top view of the contemporary clean room conveyor of FIG. 1.

FIG. 3 is a perspective view of a dual-path clean room conveyor 300, according to an embodiment of the present invention. Conveyor 300 includes a first guide rail 320 and a plurality of motors 322 coupled to the first guide rail 320. The motors 322 may be stepper motors attached to the first guide rail 320, for example. Preferably but not necessarily, each of the plurality of motors 322 may be selectively driven either clockwise or counter-clockwise, so that the conveyor 300 may operate bi-directionally. Conveyor 300 also includes a plurality of drive roller pairs 302, 304, each drive roller pair 302, 304 comprising two drive rollers, with a corresponding one of the plurality of motors 322 disposed between the two drive rollers and applying torque to both of the two drive rollers. Preferably but not necessarily, each of the plurality of motors 322 may be disposed between the first guide rail 320 and a second guide rail 342. Also optionally, each of the plurality of drive roller pairs 302, 304 may be disposed between the first guide rail 320 and the second guide rail 342. The drive roller pairs 302, 304 define a first conveyor path 310.

The conveyor 300 also includes a third guide rail 370 and a plurality of motors 372 coupled to the third guide rail 370. Conveyor 300 also includes a plurality of drive roller pairs 352, 354, each drive roller pair 352, 354 comprising two drive rollers, with a corresponding one of the plurality of motors 372 disposed between the two drive rollers and applying torque to both of the two drive rollers. The drive roller pairs 352, 354 define a second conveyor path 360. Note that in the embodiment of FIG. 3, the first conveyor path 310 may optionally be disposed between the first guide rail 320 and the second guide rail 342, and the second conveyor path 360 may be disposed between the second guide rail 342 and the third guide rail 370. Alternatively, the second guide rail 342 may be omitted from the design, and/or the first and second conveyor paths 310, 360 may be spaced apart, or the conveyor may only have a single path.

The conveyor 300 may optionally include a plurality of sensors 374, each of the plurality of motors 372 being responsive to a signal from at least one of the plurality of sensors 374. The sensors 374 may sense the presence or absence of a moving part or pallet on the second conveyor path 360 (e.g. like the pallet 340 on conveyor path 310), so that a computer or other controller can use the sensed location or absence of the moving part or pallet in driving (or not driving) one or more of the motors 372. In certain embodiments, based on the state of the sensors 374, the conveyor 300 will not attempt to propel an upstream part, tray, or pallet into a downstream zone unless that downstream zone is free to accept the upstream part, tray, or pallet without collision or obstruction. Such avoidance of collisions or obstructions may reduce debris generation in the clean room environment.

FIG. 4 is a top view of a single-path clean room conveyor 400 according to another embodiment of the present invention. FIG. 5 is a perspective view of the clean room conveyor 400. Now referring to FIGS. 4 and 5, conveyor 400 includes a first guide rail 420 and a plurality of motors 422 coupled to the first guide rail 420. The motors 422 may be stepper motors attached to the first guide rail 420, for example. The conveyor 400 optionally includes a conveyor base 444, and the motors 422 may be attached to the conveyor base 444 rather than to the first guide rail 420, so that the motors are coupled to the first guide rail 420 via the conveyor base 444. Preferably but not necessarily, each of the plurality of motors 422 may be selectively driven either clockwise or counter-clockwise, so that the conveyor 400 may operate bi-directionally.

Conveyor 400 also includes a plurality of drive roller pairs 402, 404, each drive roller pair 402, 404 comprising two drive rollers, with a corresponding one of the plurality of motors 422 disposed between the two drive rollers and applying torque to both of the two drive rollers. Preferably but not necessarily, each of the plurality of motors 422 may be disposed between the first guide rail 420 and a second guide rail 442. Note that the optional second guide rail 442 is not shown in FIG. 5 so that the drive roller pairs 402, 404 can be more clearly shown in that view. Also optionally, each of the plurality of drive roller pairs 402, 404 may be disposed between the first guide rail 420 and the second guide rail 442.

In certain embodiments, a maximum width W of the conveyor 400, measured in a width direction that is normal to the first guide rail 420, is less than 85 mm. In the embodiment of FIGS. 4 and 5, the motors 422 being disposed between rollers of the roller pairs may facilitate such an inequality. Such inequality may not be achievable in certain prior art designs where the motors extend outside of the rail(s).

For example, in certain embodiments, the maximum width W of the conveyor 400 may be less than that of a prior art design having the same inter-rail spacing (i.e. designed for the same pallet width), by as much as the motor width m. The motor width m (measured in the width direction that is normal to the first guide rail 420), may be in the range 12 mm to 150 mm in certain embodiments. Hence, the maximum width W of the conveyor 400 may be less than that of a prior art design (having the same inter-rail spacing), by 12 mm to 150 mm in certain embodiments. In certain cases the maximum width W may be a critical dimension because its reduction may save or facilitate more efficient use of costly clean room space.

The conveyor 400 may optionally include a plurality of sensors 424, each of the plurality of motors 422 being responsive to a signal from at least one of the plurality of sensors 424. The sensors 424 may sense the presence or absence of a moving part, pallet, or tray on the conveyor 400, so that a computer or other controller can use the sensed location or absence of the moving part or pallet in driving (or not driving) one or more of the motors 422. In certain embodiments, based on the state of the sensors 424, the conveyor 400 will not attempt to propel an upstream part, tray, or pallet into a downstream zone unless that downstream zone is free to accept the upstream part, tray, or pallet without collision or obstruction. Such avoidance of collisions or obstructions may reduce debris generation in the clean room environment.

In the embodiment of FIGS. 4 and 5, the conveyor 400 optionally includes a plurality of idle rollers 406. Each of the plurality of idle rollers 406 is preferably free to independently rotate. In the embodiment of FIGS. 4 and 5, each of the plurality of idle rollers 406 defines an idle roller diameter that is less than the diameter of the rollers in the drive roller pairs 402 and 404. The idle rollers 406 may advantageously allow the conveyor 400 to convey shorter parts, pallets, or trays, than if such parts, pallets, or trays had to be supported by the drive roller pairs 402, 404, only.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A conveyor comprising:
   a first guide rail;
   a plurality of motors coupled to the first guide rail; and
   a plurality of drive roller pairs, each drive roller pair comprising two drive rollers, with a corresponding one of the plurality of motors disposed directly between the two drive rollers and aligned with an axis of rotation that is common to the two drive rollers and applying torque to both of the two drive rollers.

2. The conveyor of claim 1 wherein each of the plurality of motors is a stepper motor.

3. The conveyor of claim 1 further comprising a second guide rail, and wherein each of the plurality of motors is disposed between the first guide rail and the second guide rail.

4. The conveyor of claim 3 wherein each of the plurality of drive roller pairs is disposed between the first guide rail and the second guide rail.

5. The conveyor of claim 4 wherein the plurality of drive roller pairs comprises a first conveyor path between the first guide rail and the second guide rail, and further comprising a third guide rail, and a second conveyor path between the second guide rail and the third guide rail.

6. The conveyor of claim 1 wherein a maximum width of the conveyor, measured in a width direction that is normal to the first guide rail, is less than 85 mm.

7. The conveyor of claim 1 further comprising a plurality of idle rollers to which the plurality of motors do not apply torque, each of the plurality of idle rollers being free to independently rotate, and each of the plurality of idle rollers being disposed on the first guide rail and spaced away from every one of the plurality of drive roller pairs.

8. The conveyor of claim 7 wherein each of the plurality of idle rollers defines an idle roller diameter, and each of the plurality of drive roller pairs defines a drive roller diameter, and wherein the idle roller diameter is less than the drive roller diameter.

9. The conveyor of claim 1 further comprising a plurality of sensors, each of the plurality of motors being responsive to a signal from at least one of the plurality of sensors.

10. The conveyor of claim 9 wherein each of the plurality of motors is reversibly driven, so that the conveyor is a bi-directional conveyor.

11. The conveyor of claim 1 wherein each of the plurality of motors is attached to the first guide rail.

\* \* \* \* \*